United States Patent [19]

Ito et al.

[11] Patent Number: 5,070,354
[45] Date of Patent: Dec. 3, 1991

[54] EXPOSURE CONTROL UNIT FOR A MOTOR-DRIVEN SHUTTER

[75] Inventors: Kanji Ito; Mitsuhiro Kakuta, both of Tokyo, Japan

[73] Assignee: Seikosha Co., Ltd., Tokyo, Japan

[21] Appl. No.: 549,778

[22] Filed: Jul. 9, 1990

[30] Foreign Application Priority Data

Jul. 10, 1989 [JP] Japan ................................ 1-177593

[51] Int. Cl.$^5$ .............................................. G03B 7/00
[52] U.S. Cl. .................................. 354/412; 354/429; 354/435; 354/267.1
[58] Field of Search ............... 354/412, 434, 429, 456, 354/227, 234.1, 237, 267.1, 236, 241, 245, 250, 439, 452

[56] References Cited

U.S. PATENT DOCUMENTS 4,648,701 3/1987 Ogihara et al. .................... 354/439

OTHER PUBLICATIONS

"Algebra and Trigonometry with Applications", Worth Publishers Inc., N.Y., 1982, pp. 551-552, 556-557.

Primary Examiner—W. B. Perkey
Assistant Examiner—Cassandra Spyrou
Attorney, Agent, or Firm—Jordan and Hamburg

[57] ABSTRACT

An exposure control unit for controlling a motor-driven shutter includes an arrangement for interpolating, with linear approximation, between values in an exposure data table, in order to enable finer adjustment of the shutter without increasing the amount of stored table data.

3 Claims, 4 Drawing Sheets

EXPOSURE CONTROL UNIT FOR A MOTOR-DRIVEN SHUTTER

FIELD OF THE INVENTION:

The present invention relates to an exposure control unit for a motor-driven shutter, and more particularly to an exposure control unit for a motor-driven shutter which is capable of finely controlling the exposure of a motor-driven shutter with exposure data.

BACKGROUND OF THE INVENTION

A conventional motor-driven shutter is driven in response to an exposure value EV which is calculated from a shutter exposure time TV, a stop value AV, film sensitivity SV, object luminance BV, and so forth. The exposure value EV is calculated by a method called the APEX (Additive System of Photographic Exposure), which is able to perform operation processing in a camera with an additive operation, since the shutter stop values and so forth form a multiple series.

The exposure characteristics of the motor-driven shutter are controlled by exposure data EDn which correspond to calculated exposure values EVn. When the exposure data EDn are interpolated with respect to the exposure values EVn in a multiple series for instance, the exposure data EDn become four times as large as the multiple series. Thus, a drawback arises that the exposure data EDn requires an increase in the storage capacity of a ROM to accommodate the additional data.

Further, there is another drawback in that the required increase of ROM capacity increases the cost of the processor IC which contains the ROM, and different exposure data EDn have to be entered in advance for every type of unit, depending upon the circumstances.

SUMMARY OF THE INVENTION:

It is an object of the present invention, which has been made in view of above-described drawbacks, to provide an exposure control unit for a motor-driven shutter which is capable of exposure control with higher accuracy as compared with a unit heretofore in use, without increasing exposure data, by providing means for interpolating between mutual exposure data with linear approximation.

In order to achieve the above-described object, an exposure control unit for a motor-driven shutter according to the present invention is comprised of a photometric circuit which receives incident light from an object and outputs object luminance as luminance data. A motor-driven shutter is driven by a motor rotating in response to exposure data corresponding to the luminance data. An exposure data table is provided in which exposure data for controlling the motor-driven shutter at a proper exposure are stored. A means for performing interpolating operations between exposure data is provided, which interpolates between mutual exposure data stored in the exposure data table with linear approximation.

DESCRIPTION OF THE PREFERRED EMBODIMENTS

An embodiment of an exposure control unit of a motor-driven shutter according to the present invention will be described in detail hereafter with reference to FIG. 1 and FIG. 2.

Figure 1:
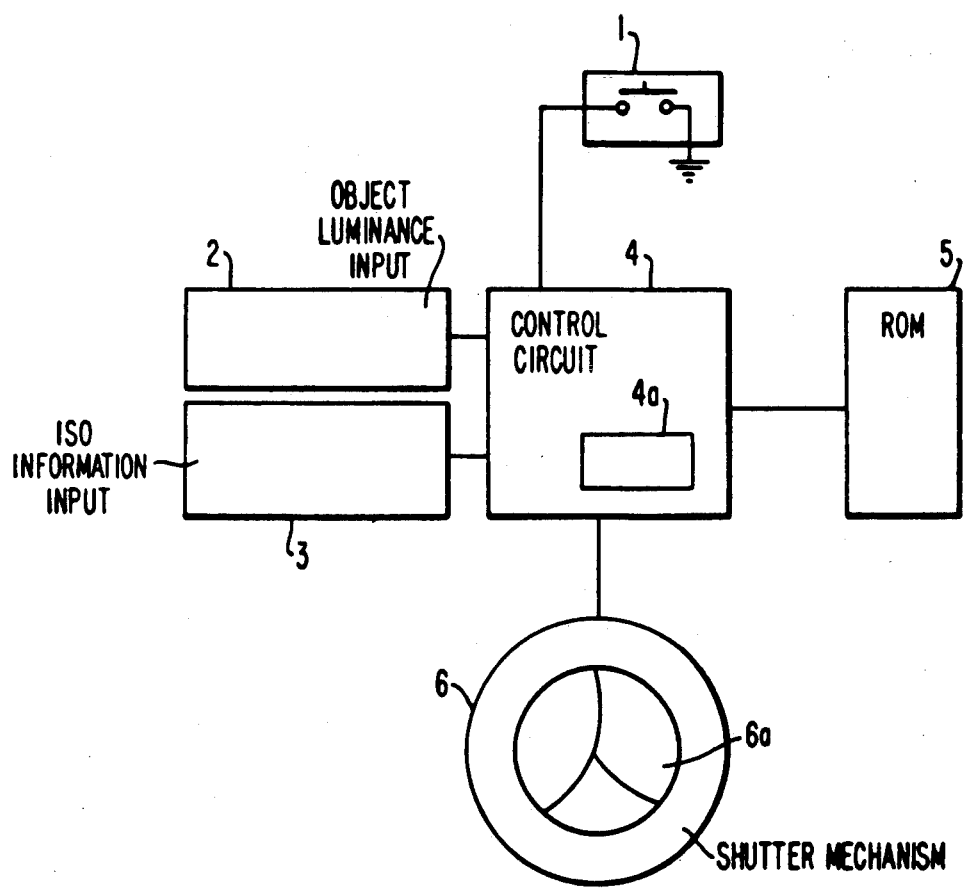
FIG. 1 is a block diagram showing an embodiment of an exposure control unit of a motor-driven shutter according to the present invention.
Figure 2:
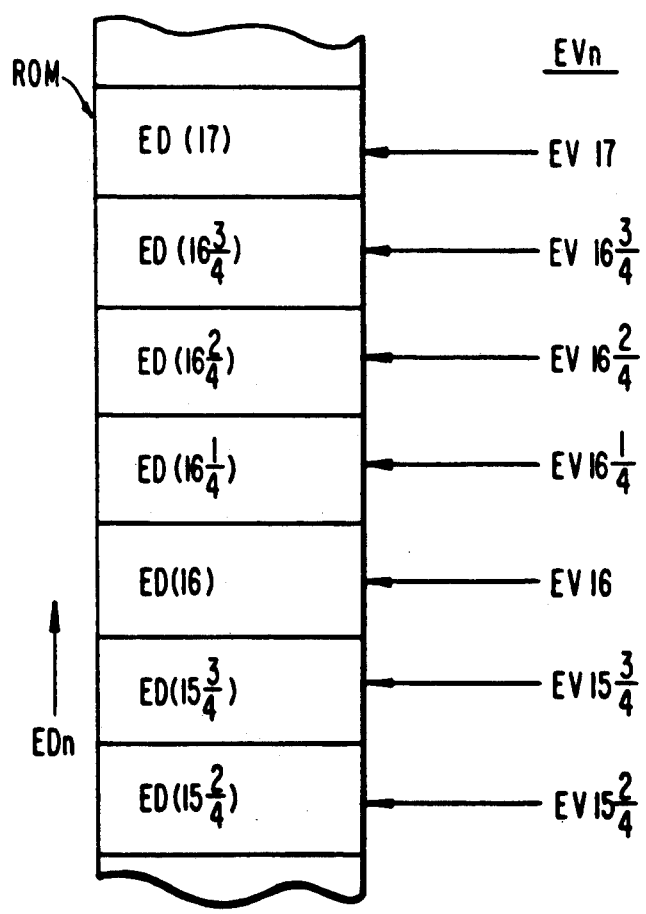
FIG. 2 is a data composition diagram related to FIG. 1.

In FIG. 1, an object-luminance input means 2 and an ISO information input means 3 are connected to apply input object luminance BV and film sensitivity SV into a control circuit 4. In a ROM 5, exposure data EDn, n=17, 16¾, ..., shown in FIG. 2 are stored in four times of a multiple series corresponding to the exposure value EVn.

In the control circuit 4, a means 4a for performing interpolating operations between the exposure data is provided with a program logic. The means for performing interpolating operations between the exposure data calculates driving data EXDx in accordance with the expression (1).

$$EXDx = \left( \frac{ED(a + d) - EDa}{d} \times (x - a) \right) + EDa \quad (1)$$

Here, a and represent exposure data above and below the value corresponding to n in the series of the exposure data EDn; d represents a split number of the multiple series of the exposure data, i.e., the difference between adjacent values in the table; EDn and x represents a proper exposure (EV) shown with x of the driving data EXDx.

When a release button 1 is depressed, the driving data EXDx are calculated, and a shutter blade 6a of a shutter mechanism 6 is opened and closed.

OPERATION OF THE INVENTION

When the proper exposure EV is at x=EV 16-1/6 in the exposure control unit of the motor-driven shutter constructed as described above, a=16 and a+d=16¼ in the expression (1). Therefore, the driving data EXDx is obtained with an expression (2) which appears below.

$$EXDx = \left( \frac{ED\left(16\frac{1}{4}\right) - ED(16)}{\frac{1}{4}} \times \left(16\frac{1}{6} - 16\right) \right) + ED(16) \quad (2)$$

EXDx obtained with the expression (2) provides driving data corresponding to the proper exposure EV calculated with ED 16¼ and ED 16.

Figure 3:
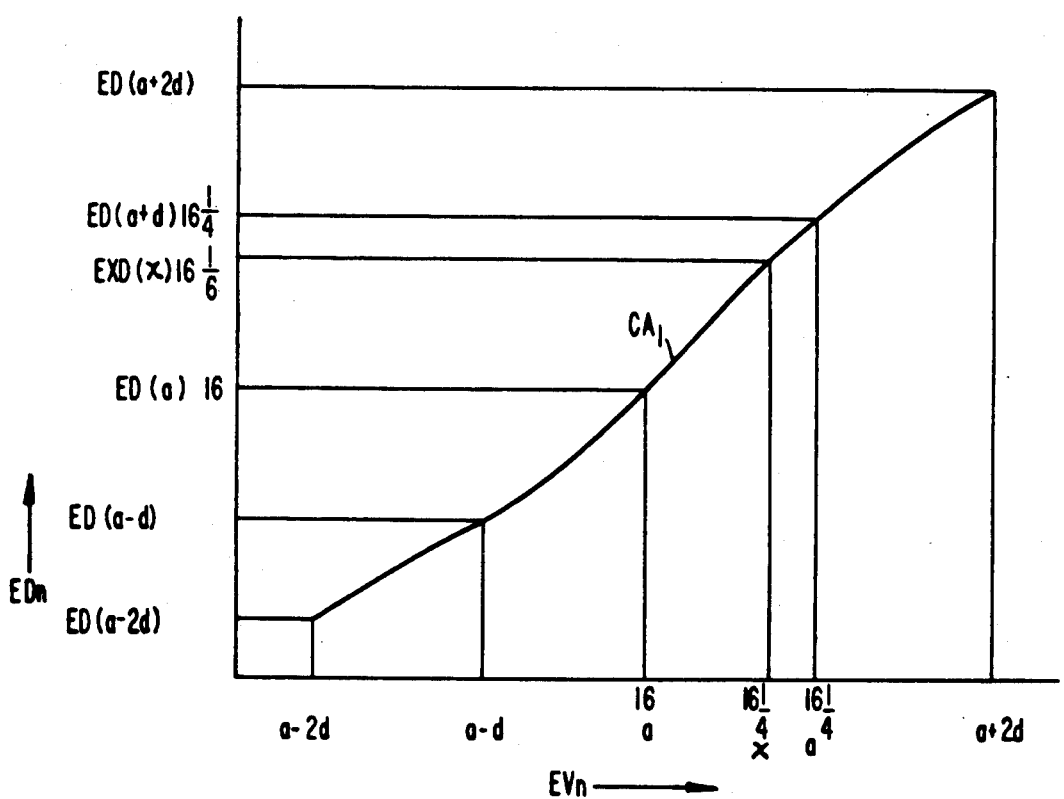
FIG. 3 and FIG. 4 are characteristic diagrams related to FIG. 2.

When the exposure EVn which is desired to be interpolated for a=16 and a+d=16¼ along the x-axis of a curve CA₁ of the exposure EVn versus the exposure data EDn shown in FIG. 3 is at 16-1/6, the driving data EXDx calculated with the expression (2) obtained is EXD 16-1/6.

Figure 4:
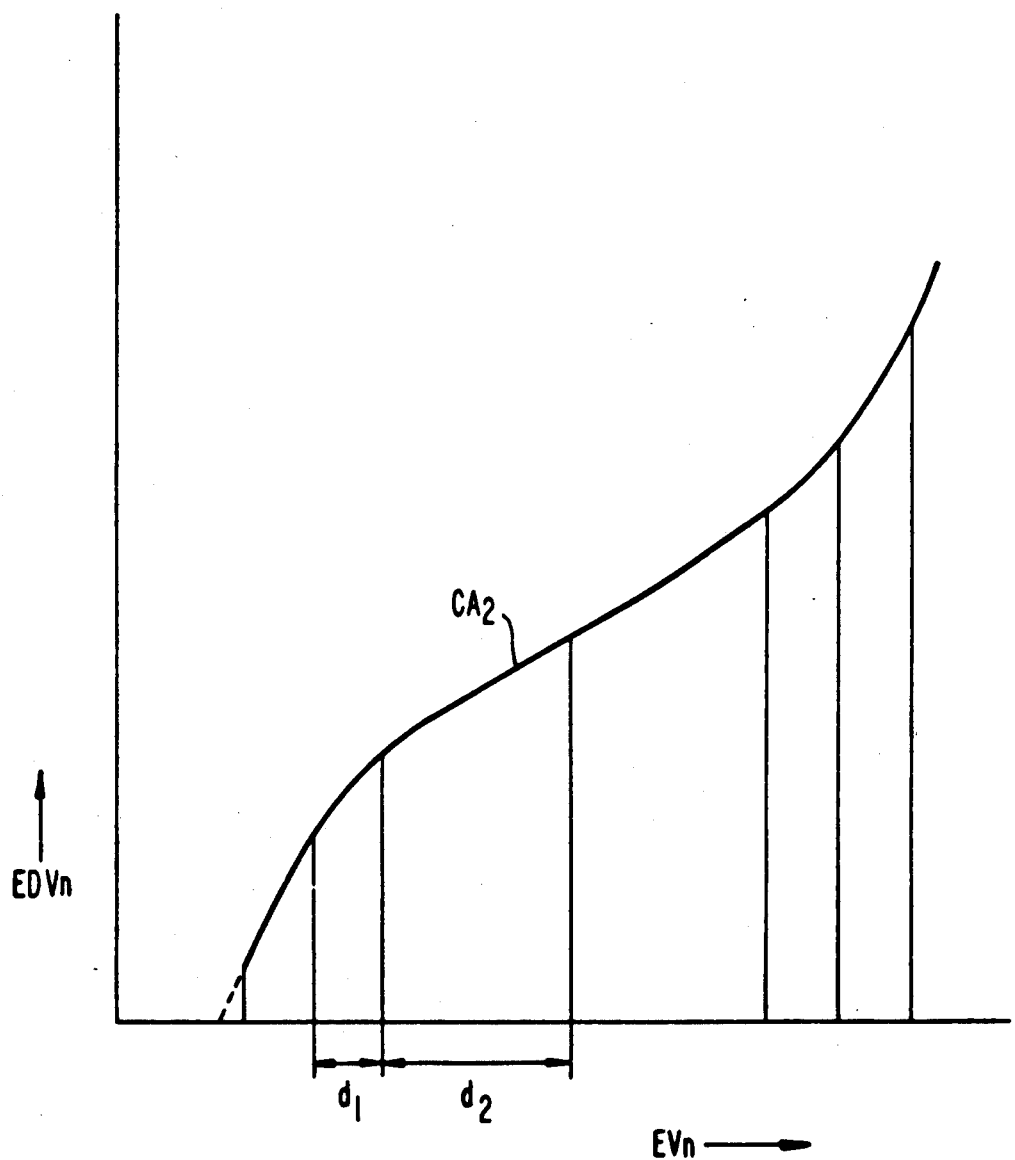

In the above-described embodiment, the multiple series has been split at equal intervals with the split number of ¼. However, when the split is made finer, where a rate of change is high in accordance with a curve $CA_2$ for obtaining $d_1, d_2 ...$ as shown in FIG. 4, compensation with a higher accuracy may be achieved.

The exposure control unit for a motor-driven shutter according to the present invention is comprised of a photometric circuit which receives incident light from an object and outputs object luminance as luminance data. A motor-driven shutter is driven by a motor rotating with exposure data corresponding to said luminance data. An exposure data table is provided in which exposure data for controlling the motor-driven shutter at a proper exposure are stored. A means is provided for performing interpolating operations between exposure data, which interpolates between mutual exposure data stored in the exposure data table with linear approximation. Therefore, it is possible to form exposure data that is several times as large as the exposure data that has been stored.

Accordingly, the invention enables exposure control with high accuracy to be made without increasing the capacity of the ROM, and different types of processor ICs need not be provided.

Although the present invention has been described through specific terms, it should be noted here that the described embodiments are not necessarily exclusive and that various changes and modifications may be imparted thereto without departing from the scope of the invention, which is limited solely by the appended claims.

What we claim is:

1. An exposure control unit for a motor-driven shutter, comprising:

a photometric circuit for receiving incident light from an object and outputting a signal corresponding to the luminance of the object;

a motor-driven shutter coupled to be driven by a motor rotating in response to exposure data;

an exposure data table storing exposure data corresponding to a series of different values of object luminance, for controlling said motor-driven;

means for accessing a set of said exposure data in said table which are above and below the value corresponding to said luminance signal and for generating an exposure data corresponding to said luminance signal in response to the data accessed thereby, by linear approximation, for controlling said motor.

2. An exposure control system for providing a control signal for controlling a motor-driven shutter, said control system comprising:

a source of a signal corresponding to object luminance;

an exposure data table for storing exposure data corresponding to a series of different values of object luminance; and means responsive to said object luminance signal data for determining an exposure value for photographing said object, comprising control circuit means for generating said control signal by linear approximation of exposure data stored in said table corresponding to predetermined stored luminance values different than the luminance value corresponding to said signal.

3. The exposure control system of claim 2, wherein said control circuit means comprises means for linearly approximating interpolating data stored in said table corresponding to luminance values above and below said luminance value corresponding to said signal.

* * * * *